B. B. BLOOD.
PHONOGRAPH CONTROLLING DEVICE.
APPLICATION FILED APR. 16, 1913. RENEWED OCT. 9, 1915.
1,193,350.
Patented Aug. 1, 1916.
3 SHEETS—SHEET 1.
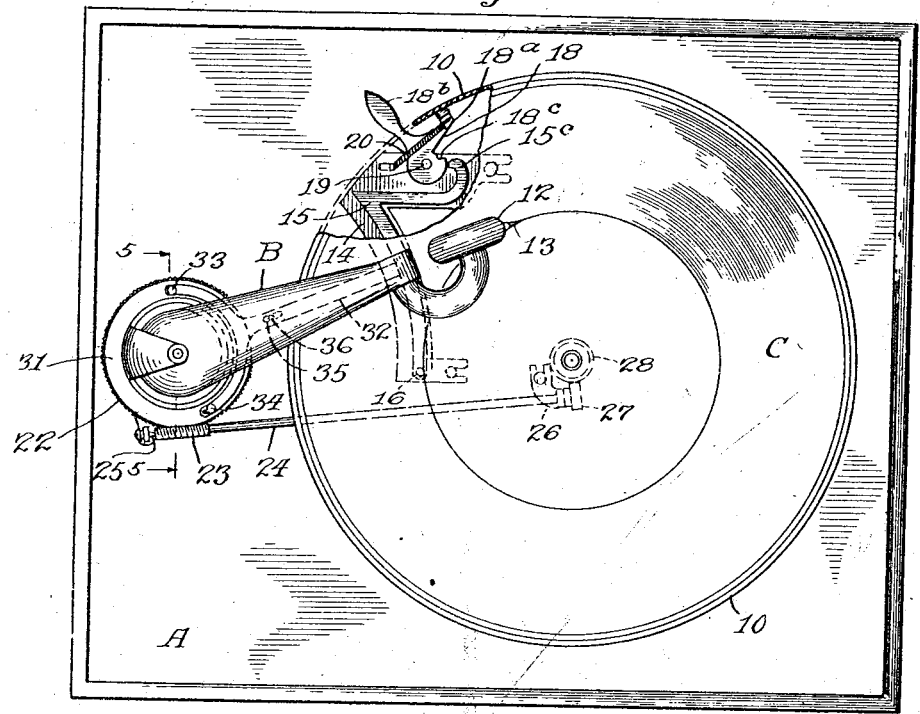
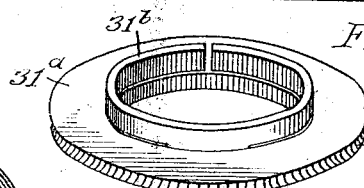
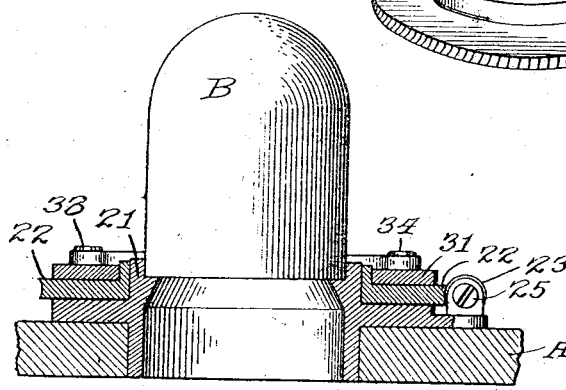
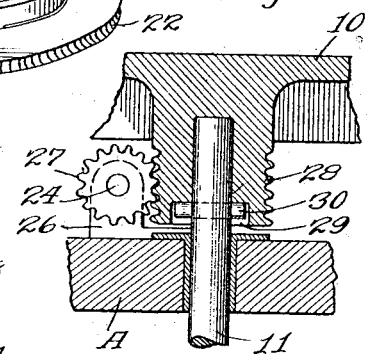
Witnesses:
L. B. Graham
R. E. Wighton
Inventor:
Burr B. Blood
By Heidman Steel
Att'ys.

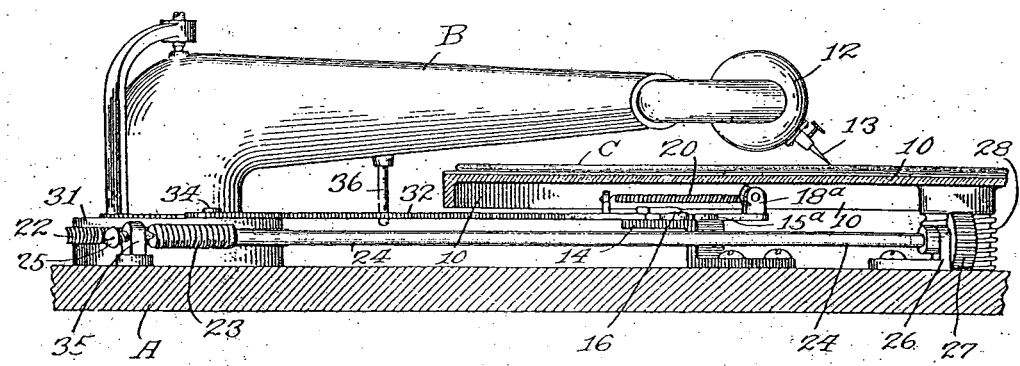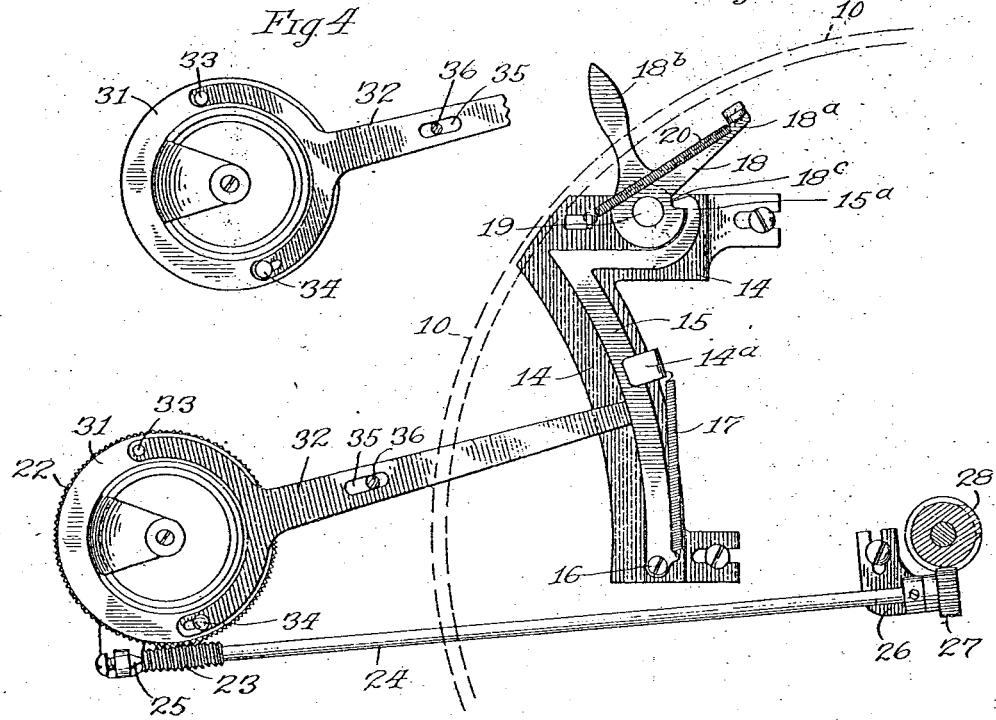

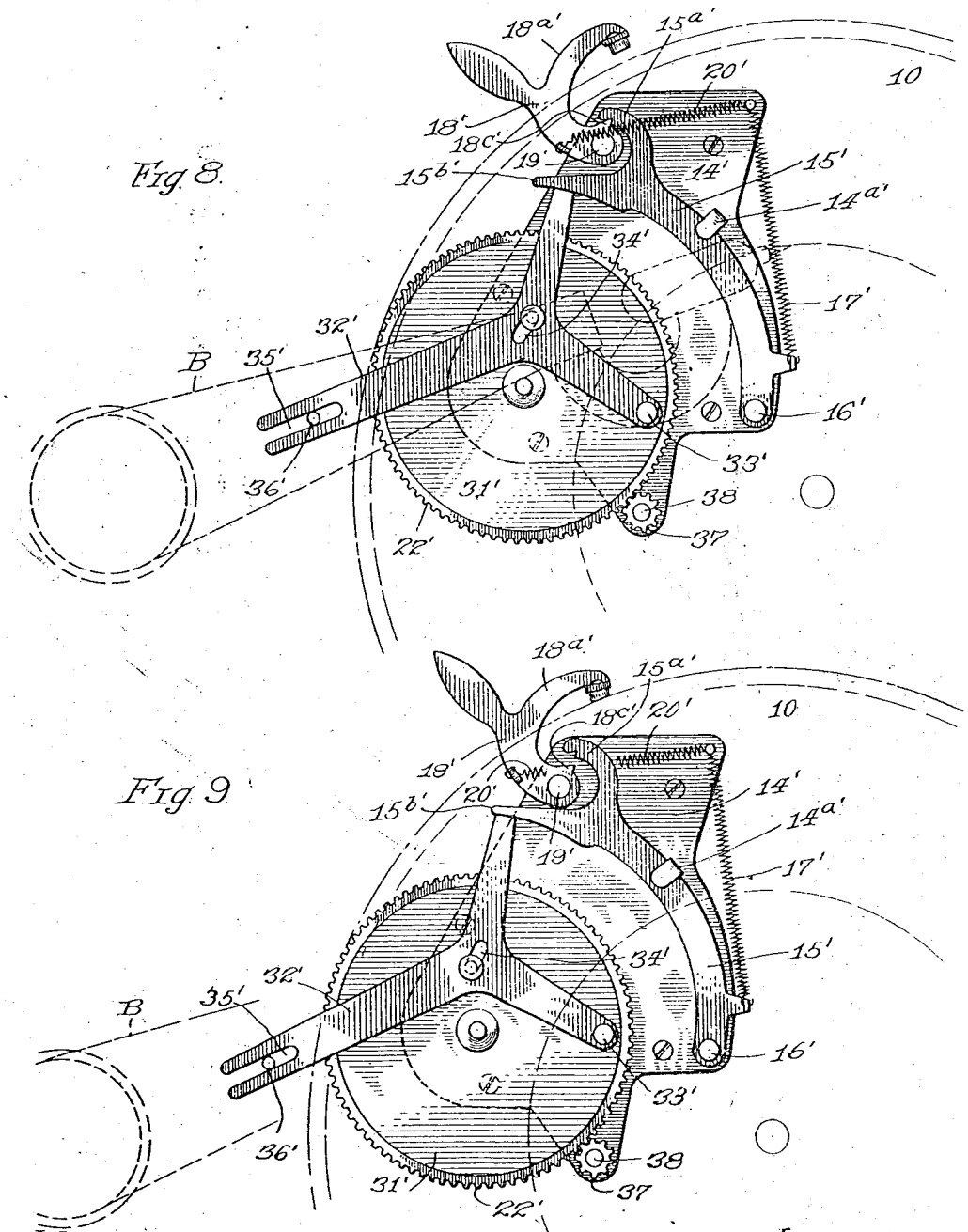

UNITED STATES PATENT OFFICE.

BURR B. BLOOD, OF CHICAGO, ILLINOIS, ASSIGNOR TO THE RAJAH COMPANY, OF CHICAGO, ILLINOIS, A CORPORATION OF ILLINOIS.

PHONOGRAPH-CONTROLLING DEVICE.

1,193,350.

Specification of Letters Patent.

Patented Aug. 1, 1916.

Application filed April 16, 1913, Serial No. 761,581. Renewed October 9, 1915. Serial No. 55,110.

*To all whom it may concern:*

Be it known that I, BURR B. BLOOD, a citizen of the United States, and a resident of Chicago, in the county of Cook and State of Illinois, have invented a certain new and useful Improvement in Phonograph-Controlling Devices, of which the following is a description, reference being had to the accompanying drawings, which form a part of my specification.

My invention is more especially intended for use in connection with phonographs employing disk records, and has for its object the provision of means whereby the operation of the motor of the phonograph, and, therefore, the rotation of the record-carrying member or table, will be automatically controlled at the predetermined or proper moment, whereby the useless operation of the motor after the record has been reproduced or completed will be prevented, until the usual motor stopping mechanism, with which phonographs are generally provided, can be operated.

The object of my invention is the provision of a device which may be readily adjusted to different sized records or machines; the device being such that when the stylus or needle of the reproducer reaches the innermost circle, in other words, the end of the record, it will be moved into "braking" position and the record-carrying member or turn-table automatically held against rotation.

A further object of the invention is the provision of a device which will be controlled by the reproducer arm, so that additional adjusting or "setting" of the controlling device is made unnecessary, as will be more fully understood from the following detailed description.

In the drawings:—Figure 1 is a plan view of a phonograph provided with my improved controlling device; a portion of the record disk and record-disk-carrying member or turn-table being broken away in order to more clearly show the brake portion of the device beneath. Fig. 2 is a partial sectional and partial side elevation of a portion of the upper part of the phonograph with my improved device as illustrated in Fig. 1. Fig. 3 is a top plan view of my improved device secured in place as shown in Fig. 2, with the reproducer arm removed, and a portion of the turn-table shown in dotted lines, while the box-top or cabinet is omitted. Fig. 4 is a detail plan view of a portion of the controlling device as shown in Fig. 3, namely the collar and lever portion which encircle the base of the reproducer arm. Fig. 5 is a sectional view taken on the line 5—5 of Fig. 1, looking in the direction of the arrows. Fig. 6 is a detail sectional view illustrating the portion of the device which engages with the turntable hub or with the operating shaft. Fig. 7 is a detail perspective view of a modified form of frictional split collar, adapted to surround the base of the reproducer arm. Fig. 8 is a top plan view of a modified form of my device wherein substantially the entire mechanism is located beneath the turntable; the reproducer and a portion of the turn-table being shown in dotted lines with the box top or cabinet omitted. Fig. 9 is a similar view to Fig. 8 with the mechanism shown in tripped or braking position.

As my invention has nothing to do with the construction of the phonograph or of the motor, a description thereof need not be entered into; the cabinet or member A being of the usual construction and provided with the usual operating motor whereby the record-carrying member or turn-table 10 is rotated by means of the spindle or shaft 11.

As an exemplification of my invention, I illustrate the same applied to a phonograph provided with the usual hollow reproducer arm B, which is mounted so as to oscillate horizontally; the outer end of the arm being provided with the usual reproducer 12, having the usual stylus or needle 13. In phonographs of the type illustrated, the hollow arm B with the reproducer 12, is so mounted as to permit it to move in the arc of a horizontally disposed circle, that is from the outer circumference or groove of the record-disk or plate C toward the inner circumference or groove thereof.

Secured beneath the record carrying member or turn-table 10, and at a suitable point in proximity to the periphery of the turn-table and preferably on top of the cabinet A of the phonograph, I provide a plate or supporting member 14, to which is pivotally secured an arcuated member 15. The member 15 is preferably pivotally secured at its one end, as at the point 16, to the plate 14. The member 15 is curved in the arc of a circle identical with that described by the reproducer arm B, and the free end is provided with a hook-portion 15ª. The hook member 15 is controlled by a coil spring 17, one end whereof is secured to a lug 14ª secured to plate 14; and which is also arranged to overlap the member 15 so as to prevent any upward movement of member 15. The tendency of the spring 17 is to force the hook portion of the member 15 toward the brake-member now to be described.

Pivotally mounted on the plate 14 and in proximity to the hook portion of member 15 is a brake-member 18, pivoted at the point 19. The member 18 is pronged or bifurcated as clearly shown in Fig. 3; the one prong or bifurcation 18ª constituting the brake applying portion, while the other prong or bifurcation 18ᵇ is the hand engaging or adjusting portion. The central or hub portion of member 18 is provided with a shoulder or notch as shown at 18ᶜ which is adapted to be engaged by the hook portion of member 15 when the device is adjusted or out of "braking" position. In the exemplification of my invention as shown in the drawings, the brake member 18 is controlled by a coil spring 20, one end whereof is secured to the free end of the prong or bifurcation 18ª while the other end is secured to a lug on the plate 14. It is clearly evident from the construction shown that the spring 20 tends to move member 18 about its pivot and draw the prong or bifurcation 18ª toward the outer periphery or flanged circumference of the record carrying table or member 10, which is shown in dotted lines in Fig. 3.

Surrounding the hub portion of the collar or member 21 which receives the base of the reproducer arm B, see Fig. 5, I provide a gear 22, which is arranged to mesh with a worm 23 secured at the end of a shaft 24. The ends of shaft 24 are provided with suitable bearings, as for example a pivotal or pin and socket bearing shown at 25, and the support or standard 26. The support for the pivot or pin bearing 25 may be secured to the flange or rim of the member 21, or to the cabinet of the phonograph, as clearly shown in the drawings. The bearing or support 26 for the opposite end of shaft 24 is shown secured to the box or cabinet of the phonograph at a point in proximity to the spindle or shaft 11. The end of the shaft 24 in proximity to the spindle or shaft 11, or rather in proximity to the hub of the turn-table 10, is provided with a suitable gear 27, which is adapted to mesh with a worm gear 28 secured either to the shaft 11 or to the hub of the turn-table or plate 10. In the specific construction shown in the drawings, the worm 28 is shown formed integral with the hub of the turn-table 10; it will be understood, however, that the worm 28 may be formed separately in the nature of a ferrule or sleeve, which may be slipped onto the hub of the turn-table 10 or the shaft 11, so as to rotate therewith. The worm hub 28 is shown provided with a socket as at 29 to receive the cross pin 30 whereby a positive engagement with the shaft 11 is formed.

It is evident from the construction just described that as the shaft 11 is rotated by the motor of the phonograph, the member 10 together with the worm hub 28 will also be rotated, which in turn will rotate the gear 27, rotating shaft 24, and thereby rotate worm 23, secured at the other end of the shaft 24, which meshes with gear wheel 22.

Mounted on the horizontally disposed gear wheel 22 and in frictional engagement therewith, is an annular plate or member 31. The member 31 is preferably arranged to fit about the vertical flange on gear wheel 22, as more clearly shown in Fig. 5. A modified form as shown at 31ª, see Fig. 7, may be employed; the member being provided with a split vertically extending flange 31ᵇ adapted to engage with and firmly clamp the flange or shoulder on gear 22.

Secured to member 31 is a bifurcated arm or lever 32; the free end of the arm or lever 32 being in sliding contact with the hook member 15 as clearly shown in Fig. 3. The bifurcated lever 32 is pivoted at the point 33 to the member 31; while the other bifurcated portion of lever 32 has a slot and pin connection as shown at 34 with the member 31 so as to allow this end of the lever to have slight movement in a manner tangentially to the periphery of member 31. At a point intermediate of its ends, the lever 32 is provided with a suitable slot as shown at 35, Fig. 3, which receives a guide-pin 36 secured to the reproducer arm B, see Fig. 2. It is evident from the construction just described, that the lever or arm 32 must move with the reproducer arm B, transversely of the record.

In order that the hook member 15 may occupy the same horizontal plane as the free end of lever 32, and also provide a support for the free end of lever 32, I prefer to form the plate 14 in the manner more clearly shown in Fig. 2, that is, with the main or body portion thereof bent upward and occupying a plane above the portion which receives the attaching screws whereby the plate is secured to the phonograph cabinet.

In its application, the plate 14 is secured on the phonograph cabinet or top beneath the turn-table so as to bring the brake-member 18 into close proximity to the depending flange at the periphery of the turn-table, as more clearly shown in Fig. 3; and the shaft 24 is adjusted so that the gear 27 will mesh with worm 28 of the turn-table 10, with worm 23 in mesh with gear 22; brake-member 18 is then swung about its pivotal point 19 out of "braking" position, so as to bring the notch 18ᶜ at a point where it may be engaged by the hook of the member 15; the latter being held in constant frictional engagement with member 18 by the action of spring 17, while the spring 20 will hold the brake-member 18 under tension so as to move it into engagement with the flange or rim of the turn-table as soon as member 18 is released by hook-member 15.

After the record-disk has been put into place, the reproducer arm B with the needle 13 is then moved toward the outer circle or groove on the record plate. This movement of the arm B will compel the lever 32, that is the free end thereof, to move in a similar direction, namely toward the hook end of member 15, by reason of the pin 36 which engages in the slot 35 of lever 32. As the motor of the phonograph is set in operation, the shaft 11 will be operated and turn-table or member 10 rotated. The rotation of turn-table 10, with its worm hub 28, will necessarily rotate gear 27 and, therefore, shaft 24, which in turn, by reason of the worm 23, will rotate gear 22; the gearing being such that gear 22, and therefore member 31, will revolve at substantially the same speed as the arm B of the phonograph. The stylus or needle 13 will, of course, compel the reproducer arm B to move from the outer circumference of the record-disk toward the center thereof, until the stylus reaches the innermost groove, when further transverse movement of the reproducer arm B toward the center of the record-plate is prevented. As the motor, and therefore shaft 11, will still continue operating, it is evident that shaft 24 will be rotated and in turn gear 22. The continued rotation of gear 22 and therefore rotary movement of member 31 will tend to move the lever or arm 32 still farther, but by reason of the pin 36 on arm B, movement of lever 32 in a circular direction will be prevented. The force exerted by gear 22 and member 31, while the free end of lever 32 is held against further rotary movement by pin 36, will, therefore, cause lever 32 to move about its pivotal point 33, made possible by the slot connection 34 and 35, and force the lever toward hook-member 15. This movement of the lever 32 and member 15, will release brake-member 18, which, by reason of spring 20, will engage with the rim or flange of turn-table 10 and hold it against further rotation, and therefore also stop operation of shaft 11 and the motor. The brake-end 18ᵃ of member 18 is preferably provided with proper material to induce a good frictional contact with the flange or rim of the turn-table.

In Figs. 8 and 9 I illustrate a modified form of my invention, wherein substantially the entire mechanism is located beneath the turn-table and the tripping lever or mechanism is operated directly from the motor within the cabinet of the phonograph, instead of having the tripping mechanism operable from the turn-table shaft or spindle. In Fig. 8 the mechanism is shown in "set" position with the stylus or needle of the reproducer at the innermost circle of the record disk, the mechanism being shown in position just prior to the tripping action. In Fig. 9, I illustrate this modified form in tripped position, that is, with the braking member in contact with the outer periphery of the turn-table.

In the modification shown in Figs. 8 and 9, I show the plate or supporting member 14' secured to the top of the cabinet of the phonograph at a point intermediate of the turn-table operating spindle or shaft, and the outer periphery of the turn-table. In this construction the arcuate member 15' is pivotally secured at its one end in a manner similar to that of the construction shown in the previous figures; the free end of the arcuate or hook member 15', however, is somewhat differently constructed from that shown in the previous figures, namely the free end is shown bifurcated, one of the bifurcations constituting the hook portion 15ᵃ' while the other bifurcation 15ᵇ' constitutes the tripping mechanism engaging portion. The member 15', as in the case of member 15, is preferably curved in the arc of a circle identical with that described by the reproducer arm B; and the member 15' is controlled by the coil spring 17' one end whereof is secured to the member 15' while the other end of the spring 17' is secured to a lug on the supporting plate or member 14'. In order that the member 15' may be held against any upward movement, I prefer to provide the supporting plate or member 14' with the overlapping lug or portion 14ᵃ'.

In this construction, the brake member 18', is pivoted at the point 19', and the one prong or bifurcation 18ᵃ' is shown curved so as to engage with the outer periphery of the turn-table 10. The central or pivoted portion of member 18' is provided with a shoulder or protruding point 18ᶜ' which is adapted to be engaged by the hook portion or member 15' when the device is adjusted or out of "braking" position. The brake member 18' is controlled by a coil spring 20', one end whereof is secured to the brake member 18' while the other end is secured to a suitable lug or point on the supporting plate or member 14', as clearly shown. The tendency of spring 20' is to move member 18' about its pivot and bring the bifurcation 18ᵃ' against the outer periphery or flanged circumference of the record-carrying table or member 10. In this construction the gear wheel 22' is rotatively mounted on the supporting plate or member 14', and this gear wheel 22' meshes with a pinion 37 secured to a spindle or shaft 38 which latter extends into the cabinet or box of the phonograph and is directly operated by the motor. The annular plate or member 31', as in the previous construction, is held in frictional engagement with the gear 22'. In this construction, the tripping member or lever 32' is shown in the nature of a Y and is pivoted at the point 33' to the member 31' and is also provided with a slot and pin connection at 34' with member 31' so as to allow of slight independent movement on the part of the tripping lever 32'. The long arm of the tripping lever 32' is shown slotted as at 35'; the slot being intended to receive the guide pin 36' which is secured to the reproducer arm B. As the reproducer arm B with the needle or stylus is moved toward the outer circle or groove of the record plate, it will compel the trip lever 32' to oscillate and thereby rotate annular plate 31' so as to bring the hook member engaging portion of lever 32' in proximity to the pivotal point 16' of member 15'. As the plate 31' merely has frictional contact with the gear 22', it is possible to rotate plate 31' independently of the rotation of gear 22'. The brake member 18' is then moved against the action of its spring 20' thereby bringing the turn-table engaging portion 18ᵃ' out of contact with the periphery of the turn-table. This movement of the brake member 18' will bring the shoulder or tooth 18ᶜ' into engagement with the notch in the hook member 15'. The motor is then set in operation and thereby movement is imparted to gear 22' by reason of the pinion 37; the relation between the pinion and gearing being such that gear 22', and therefore member or plate 31', will revolve at substantially the same speed as the arm B of the phonograph. The trip lever 32' will move in unison with the reproducer arm B until the stylus or needle of the reproducer reaches the innermost circle of the record when further movement of the reproducer is stopped. As the motor will continue to operate and therefore shaft 38 will still be rotating the pinion 37 and gear 22', the pivotal point 33' will be moved toward the hook member 15', while the long arm of the trip lever 32' will be held against movement by reason of the pin 36 secured to the reproducer arm B which now is stationary. This holding tendency on the part of the reproducer arm will force the trip member 32' into contact with the hook member 15' which movement is made possible by reason of the slot and pin connection 34'. The movement of the trip lever 32' against the hook member 15' will move the latter out of engagement with the brake member 18' and therefore allow the action of spring 20' to force the brake member into contact with the turn-table 10 and hold the latter against further rotation and thereby stop the operation of the motor.

I have shown and described what I believe to be the simplest and best construction. I have shown, for example, the mechanism arranged on the top of the cabinet or box of the phonograph, but it will be readily understood that a portion of the device might be arranged within the cabinet or box and only the brake-member arranged where it can form a braking contact with the turn-table; and it is apparent that other modifications may be made in certain details without, however, departing from the spirit of my invention, and I, therefore, do not wish to be understood as limiting myself to the exact construction shown and described herein.

What I claim is:—

1. In a phonograph controlling device, the combination with a rotating member and operating mechanism therefor and a traveling member, a brake-member, means whereby said brake-member is held out of braking position, means operatively connected with the traveling member so as to be moved thereby, and means intermediate of the rotating member operating mechanism and said second mentioned means whereby the latter is given movement at an angle to the normal direction of travel thereof so that the first mentioned means is moved out of engagement with the brake-member and the latter permitted to move into braking relation with the rotating member.

2. In combination with a rotating member, operating mechanism therefor, and a traveling member, a controlling device comprising a pivotally mounted brake-member adapted to engage with the rotating member, means whereby said brake-member is held out of braking position, pivotally mounted means operatively connected with the traveling member so as to be controlled thereby, and rotatably mounted means arranged intermediate of the rotating member operating mechanism and the second mentioned means whereby the second mentioned means is given movement at an angle to the normal direction of the travel thereof when the traveling member becomes stationary so that the first mentioned means is moved out of engagement with the brake-member and the latter permitted to move into braking engagement.

3. In combination with a rotating member and a traveling member, a controlling device comprising a brake-member, a spring controlled member normally engaging said brake-member to hold the same out of operative position, a pivotally mounted lever adapted to be controlled by said traveling member, and rotating mechanism operatively connected with said lever and arranged to move with the traveling member, said mechanism, when the traveling member is stationary being adapted to give movement to the lever in a direction at an angle to the normal direction of travel whereby said lever will move said spring controlled member out of holding engagement with the brake-member.

4. In combination with a rotating member, operating mechanism therefor, and a traveling member, a controlling device comprising a brake-member adapted to engage with the rotating member, a movable arcuate member normally held in engagement with said brake-member to hold the latter out of braking position, a pivotally mounted lever operatively connected with the traveling member while one end of the lever is adapted to move in juxtaposition to said arcuate member, and rotating means operatively connected with said lever and with the rotating member operating mechanism, said rotating means being arranged to move the end of said lever against said arcuate member when the traveling member becomes stationary, thereby moving the arcuate member out of holding engagement with the brake-member.

5. In combination with a rotating member, rotating mechanism therefor, and a traveling member, a controlling device comprising a brake-member normally adapted to form braking engagement with the rotating member, a spring controlled pivoted member normally holding said brake-member in inoperative position, a bifurcated lever pivotally secured at one of the bifurcations and in operative engagement with the traveling member, and means adapted to be rotated by the rotating member rotating mechanism and in operative engagement with said lever whereby the latter is forced against said spring controlled pivoted member so as to release the brake-member when the traveling member becomes stationary.

6. In combination with a rotating member, operating mechanism therefor, and a traveling member, a controlling device comprising a spring controlled brake-member, an arcuate member pivoted at one end and normally holding said brake-member out of braking position, a pivoted lever adapted to move through the arc of a circle corresponding with the arc described by said arcuate member, said lever having operative connection with the traveling member, and rotating means intermediate of said lever and the rotating member operating mechanism whereby the lever is forced against said arcuate member when the traveling member becomes stationary, thereby releasing the brake-member.

7. In combination with a rotating member, operating mechanism therefor, and a traveling member, a controlling device comprising a spring controlled brake-member adapted to form braking engagement with said rotating member, a spring controlled arcuate member adapted to normally hold the brake-member out of braking position, a pivoted lever having slot and pin connection with said traveling member, one end of said lever being adapted to describe the arc of a circle corresponding with that described by the arcuate member, and rotating means intermediate of the rotating member operating mechanism and said lever, said rotating means having a yielding operative connection with the lever and adapted to move said lever angularly to the arc of a circle normally described thereby so as to force the same against said arcuate member and release the brake-member.

8. A phonograph controlling device comprising in combination with a rotating member, operating mechanism therefor, and a traveling member, a rotating member engaging element, a locking member adapted to hold the rotating member engaging element out of operative position, and means adapted to move with the traveling member and be controlled thereby, said means being adapted to be affected by the rotating member operating mechanism when the traveling member becomes stationary whereby said means is given movement in a direction lengthwise of the traveling member thereby moving the locking member out of engagement with the rotating member engaging element and permitting said last mentioned element to come into braking engagement with the rotating member.

9. A phonograph controlling device comprising in combination with a rotating member, operating mechanism therefor, and a traveling member, a spring controlled brake member adapted to form engagement with the rotating member, a holding member whereby said first mentioned member is held out of engagement with the rotating member, a third member adapted to move with the traveling member and having operative engagement with the holding member and means intermediate of said last mentioned member and the rotating member operating mechanism whereby said member is given movement independently of that imparted thereto by the traveling member, so that said member will force the second or holding member out of engagement with the first mentioned member and permit the latter to form braking engagement with the rotating member.

10. A phonograph controlling device comprising in combination with a rotating member, operating mechanism therefor, and a traveling member, a member adapted to form braking engagement with the rotating member, means whereby said member is held out of braking position, a second member adapted to move with the traveling member and be controlled thereby, and means intermediate of one end of said last mentioned member and the rotating member operating mechanism whereby said member is given movement lengthwise of the traveling member when the latter becomes stationary, thereby moving the first mentioned means out of engagement with the rotating member engaging member and permitting the latter to form braking engagement with said rotating member.

11. A phonograph controlling device comprising in combination with a rotating member, operating mechanism therefor, and a traveling member, a brake member, a second member whereby the brake member is held out of braking position, means having operative relation with said second member and arranged to move the traveling member and be controlled thereby and means adapted to be rotated by the rotating member operating mechanism and having controlling relation with said first mentioned means, whereby said first mentioned means is given movement different from that of the traveling member and a second member forced out of engagement with the brake member thereby permitting the latter to come into engagement with the rotating member.

12. A phonograph controlling device comprising in combination with a rotating member, operating mechanism therefor, and a traveling member, a brake member, a second member whereby the brake member is held out of braking position, and means having operative relation with said second member and with the traveling member and adapted to move with the latter, said means being adapted to be affected by said operating mechanism when the traveling member becomes stationary, whereby said means will force the second or holding member out of engagement with the braking member and permit the latter to form braking relation with the rotating member.

13. In combination with a rotating member, operating mechanism therefor, and a traveling member, a controlling device comprising a brake-member, a holding member adapted to hold the brake-member out of braking position, pivoted means arranged to be controlled by said traveling member and adapted to affect said holding member, and means arranged to be affected by the rotating member operating mechanism and adapted to affect said pivoted means and impart movement thereto when the traveling member becomes stationary.

14. In combination with a rotating member, operating mechanism therefor, and a traveling member, a controlling device comprising a brake-member, an oscillatingly mounted holding member arranged to extend throughout the path of the traveling member, said member being adapted to normally hold the brake-member out of braking position, pivoted means arranged to travel with the traveling member and adapted to affect said holding member, and means adapted to be operated by the rotating member operating mechanism, said means having frictional engagement with the means arranged to travel with the traveling member whereby said last mentioned means will be given movement substantially at right angles to the oscillatingly mounted holding member and force the latter out of holding contact with the brake-member.

15. In combination with a rotating member, operating mechanism therefor, and a traveling member, a brake-member, means whereby the brake-member is held out of braking position, means arranged to move with said traveling member and be controlled thereby, said means being arranged to affect said first-mentioned means, and means having operative relation with said last mentioned means whereby said means is given a secondary movement when normal movement of the traveling member is prevented, thereby releasing the brake-member.

16. In combination with a rotating member, operating mechanism therefor, and a traveling member, a brake-member, means adapted to have movement with the traveling member and arranged to affect the brake-member, and means having operative relation with said last mentioned means whereby said means is given a secondary movement when normal movement of the traveling member is prevented, so that the brake-member is operated.

BURR B. BLOOD.

Witnesses:
GEORGE HEIDMAN,
R. E. WIGHTON.